United States Patent
Soldani et al.

(10) Patent No.: US 7,197,314 B2
(45) Date of Patent: Mar. 27, 2007

(54) COMMUNICATION SYSTEM

(75) Inventors: David Soldani, Espoo (FI); Pekka T. Kohonen, Espoo (FI)

(73) Assignee: Nokia Corporation, Espoo (FI)

( * ) Notice: Subject to any disclaimer, the term of this patent is extended or adjusted under 35 U.S.C. 154(b) by 499 days.

(21) Appl. No.: 10/310,129

(22) Filed: Dec. 5, 2002

(65) Prior Publication Data

US 2004/0110521 A1 Jun. 10, 2004

(51) Int. Cl.
*H04Q 7/20* (2006.01)
*H04B 7/00* (2006.01)

(52) U.S. Cl. ............... 455/450; 455/452.1; 455/515; 455/522; 455/69

(58) Field of Classification Search ........ 455/450–454, 455/509–513, 69, 522, 67.11–67.16
See application file for complete search history.

(56) References Cited

U.S. PATENT DOCUMENTS

| | | | |
|---|---|---|---|
| 6,374,112 B1 * | 4/2002 | Widegren et al. ........ | 455/452.2 |
| 6,512,931 B1 * | 1/2003 | Kim et al. ................ | 455/522 |
| 6,571,101 B1 * | 5/2003 | Schulz ..................... | 455/450 |
| 6,678,529 B1 * | 1/2004 | Moulsley et al. .......... | 455/522 |
| 6,831,910 B1 * | 12/2004 | Moon et al. ............... | 370/342 |
| 6,963,540 B2 * | 11/2005 | Choi et al. ................ | 370/252 |
| 2002/0168994 A1 * | 11/2002 | Terry et al. .............. | 455/522 |
| 2002/0168995 A1 * | 11/2002 | Terry et al. .............. | 455/522 |
| 2005/0221833 A1 * | 10/2005 | Granzow et al. .......... | 455/450 |

* cited by examiner

*Primary Examiner*—Simon Nguyen
(74) *Attorney, Agent, or Firm*—Squire, Sanders & Dempsey, LLP.

(57) ABSTRACT

There is disclosed a method of controlling common channel resources in the uplink of a communication system, wherein the control of the common channel resources is dependent upon the quality requirements associated with a radio access for use on the up-link common channel relative to a predetermined quality threshold.

18 Claims, 2 Drawing Sheets

COMMUNICATION SYSTEM

FIELD OF THE INVENTION

The present invention relates to establishing uplink connections in a radio telecommunications network.

BACKGROUND TO THE INVENTION

UTRA-FDD is an example of a third generation mobile communication system, in which a communication network infrastructure establishes communication with various mobile entities in a radio access network.

In the radio access network, communication takes place from the network to user equipment (UE) in the downlink, and from the UE to the network in the up-link.

For the purpose of communicating, there are provided two types of transport channels—dedicated channels and common channels. A common channel is a resource divided between all or a group of users in a cell, whereas a dedicated channel is by definition reserved for a single user.

In a typical UTRA-FDD system, there are two common channels for the uplink communication: the random access channel (RACH) which is mapped to the physical random access channel; and the common packet channel (CPCH), which is mapped to the physical common packet channel.

In current techniques radio access bearers are allocated to the common channels in the UTRA-FDD system on the basis of resources determination, such as network capacity.

It is an object of the present invention to provide an improved technique for optimizing the use of common channels in the uplink of a communication system.

SUMMARY OF THE INVENTION

According to a first aspect of the present invention there is provided a method of controlling common channel resources in the uplink of a communication system, wherein the control of the common channel resources is dependent upon the quality requirements associated with a radio access for use on the up-link common channel relative to a predetermined quality threshold.

The control of common channel resources may comprise selectively allocating the common channel to the radio access. The common channel may be selectively allocated to the radio access in dependence upon a quality threshold. The quality threshold may be uplink measured quality information. A dedicated channel may be allocated to the radio access if the common channel is not allocated to the radio access. Said determination may be based upon the quality characteristics required for the radio access.

The control of common channel resources may comprise dynamically controlling the power difference between an initialization transmission in the common channel and a message in the common channel. The power difference may be initially set to a predetermined value.

The power difference may be set to a value determined on the basis of the power difference required for at least one previous radio access having the same quality profile as the current radio access.

The power difference may be increased if the up-link measured quality is below a threshold value. The power difference may be decreased if the up-link measured quality is above a threshold value.

The common channel may be a random access channel. The common channel may be a common packet channel.

According to a further aspect of the present invention there is provided a method of controlling common channel resources in the uplink of a mobile communication system, wherein the control of the common channel resources is dependent upon the quality requirements of a radio access for use on the up-link common channel being within a predetermined threshold.

In a further aspect, the present invention provides an element for controlling common channel resources in the uplink of a communication system, comprising means for controlling the common channel resources in dependence upon the quality requirements associated with a radio access for use on the up-link common channel relative to a predetermined quality threshold.

The control means may be adapted to selectively allocate the common channel to the radio access. The control means may be adapted to selectively allocate the radio access in dependence upon a quality threshold. The quality threshold may be uplink measured quality information.

A dedicated channel may be allocated to the radio access if the common channel is not allocated to the radio access. Said determination is based upon the quality characteristics required for the radio access.

The control means may comprise means for dynamically controlling the power difference between an initialization transmission in the common channel and a message in the common channel. The power difference may be initially set to a predetermined value.

The power difference may be set to a value determined on the basis of the power difference required for at least one previous radio access having the same quality profile as the current radio access. The power difference may be increased if the up-link measured quality is below a threshold value. The power difference may be decreased if the up-link measured quality is above a threshold value.

The common channel may be a random access channel. The common channel may be a common packet channel.

The present invention still further discloses a radio network controller for controlling common channel resources in the uplink of a mobile communication system, comprising control means for controlling the common channel resources in dependence upon the quality requirements of a radio access for use on the up-link common channel being within a predetermined threshold.

BRIEF DESCRIPTION OF THE FIGURES

The invention is now described by way of example with reference to the accompanying drawings, in which.

DESCRIPTION OF PREFERRED EMBODIMENTS

Figure 1:
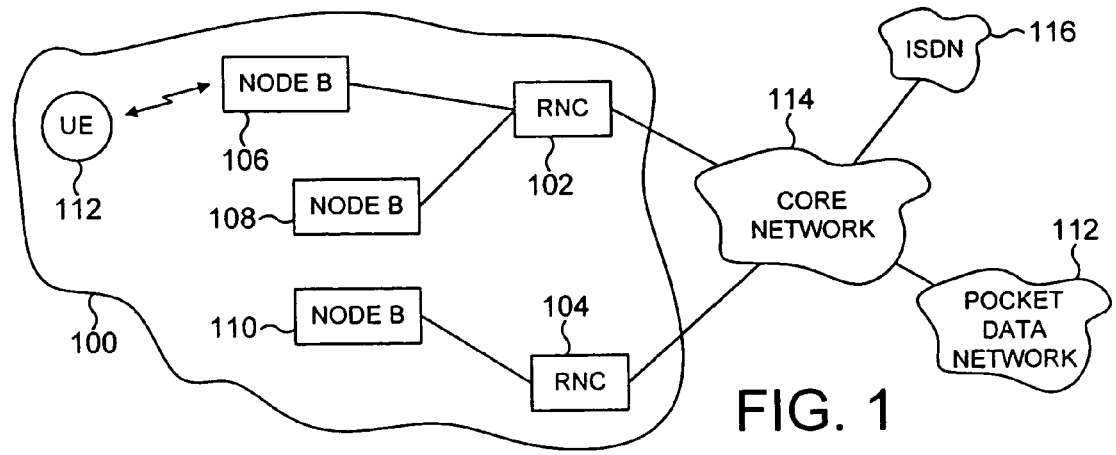
FIG. 1 illustrates an example of a UMTS radio access network.

Referring to FIG. 1, there is illustrated schematically an example of a UMTS (Universal Mobile Telecommunication System) with respect to which embodiments of the present invention may be utilized.

In FIG. 1, the UMTS radio access network (RAN) 100 includes a plurality of Node B's, such as node B's 106, 108, 110. Each Node B is connected to a radio network controller (RNC). Node B's 106 and 108 are connected to an RNC 102, and Node B 110 is connected to RNC 104. Various mobile terminals are in the radio access network, as represented by user equipment (UE) 112 connected to Node B 106. Each RNC is connected to a core network (CN) 114. The core network may further be connected to external networks, such as an ISDN network 116 or a Packet Data network 118.

The present invention is described herein with reference to the example of a UTRA-FDD communication system. The invention is not limited, however, to such a system. The invention is more broadly applicable to the allocation of channels in the up-link of a communication system, which will become apparent from the following description.

In UTRA-FDD two common transport channels have been specified: (i) the Random Access Channel (RACH) and (ii) the Common Packet Channel (CPCH).

The RACH is mapped onto the Physical Random Access Channel (PRACH). It carries uplink common control information, i.e. Common Control Channel (CCCH), such as requests to set up radio resource control (RRC) connections. It may further carry dedicated control information, i.e. the Dedicated Control Channel (DCCH), between the UE and the network, established through the RRC connection setup procedure. The RACH is further used for sending dedicated user information, i.e. the Dedicated Traffic Channel (DTCH), such as small amounts of uplink packet data.

The uplink CPCH carries dedicated packet-based user data (DTCH) or dedicated control information (DCCH). It supports uplink inner loop Power Control (PC), with the aid of a downlink Dedicated Physical Control Channel (DPCCH). Its transmission may span several radio frames and it is mapped onto the Physical Common Packet Channel (PCPCH).

Embodiments of the present invention are described hereinbelow with particular reference to the random access channel. However this is for illustrative purposes only, and the present invention is not limited in its applicability to the RACH.

Figure 2:
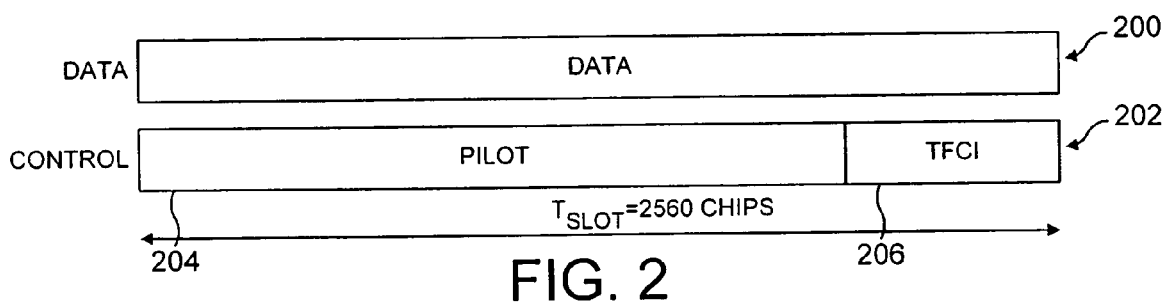
FIG. 2 illustrates the structure of a random access message part radio frame.

The slot structure of the PRACH message is illustrated in FIG. 2. It consists of two parts: a data part 200 where the RACH transport channel is mapped, and a control part 202 where the Layer 1 control information is carried. The data 200 and control 202 parts are transmitted in parallel. The spreading factors of the data part are 256, 128, 64, and 32. The control part consists of a set of pilot bits 204' and a set of transport format combination indicator (TFCI) bits 206, and has a spreading factor of 256. The TFCI (Transport Format Combination Indicator) field indicates the TF (Transport Format) of the RACH mapped to the data part of the radio frame and it is repeated in the second radio frame if the message part lasts for 20 ms. The TF defines the bit rate, channel coding, TTI etc. These concepts are described in 3GPP TS 25.302.

Each cell of the radio access network is configured by radio network planning (RNP). A cell is associated with a Node B. A "cell" is defined by a cell identification (C-ID), Configuration Generation ID, Timing delay (T_Cell), UTRA Absolute Radio Frequency Channel Number (UARFCN), Maximum transmission power, Closed Loop Timing Adjustment Mode and Primary scrambling code. For each cell, the RNP sets:

(i) the preamble scrambling code;
(ii) the message length in time (either 10 or 20 ms);
(iii) the AICH (acquisition indicator channel) transmission timing parameter (0 or 1, for setting the preamble-to-acquisition indicator distance);
(iv) the set of available signatures; and
(v) the set of available RACH sub-channels for each Access Service Class (ASC).

Other essential parameters that need to be set by the RNP are:

(vi) the power-ramping factor (Power ramp step);
(vii) the maximum number of preamble retransmission (Preamble Retrans Max);
(viii) the power offset between the power of the last transmitted preamble and the control part of the PRACH message (Power offset $Pp-m=P_{message-control}-P_{preamble}$); and
(ix) the set of transport format (TF) and transport format combination (TFC) parameters (this includes the gain factors between the data and control part of the random-access message for each TFC).

Certain ones of these parameters may be automatically produced by the radio network controller (RNC).

The user equipment (UE) receives these parameters from the system information broadcast on the broadcast control channel (BCCH). The BCCH may be updated by the RNC before any physical random access procedure is initiated.

Figure 3:
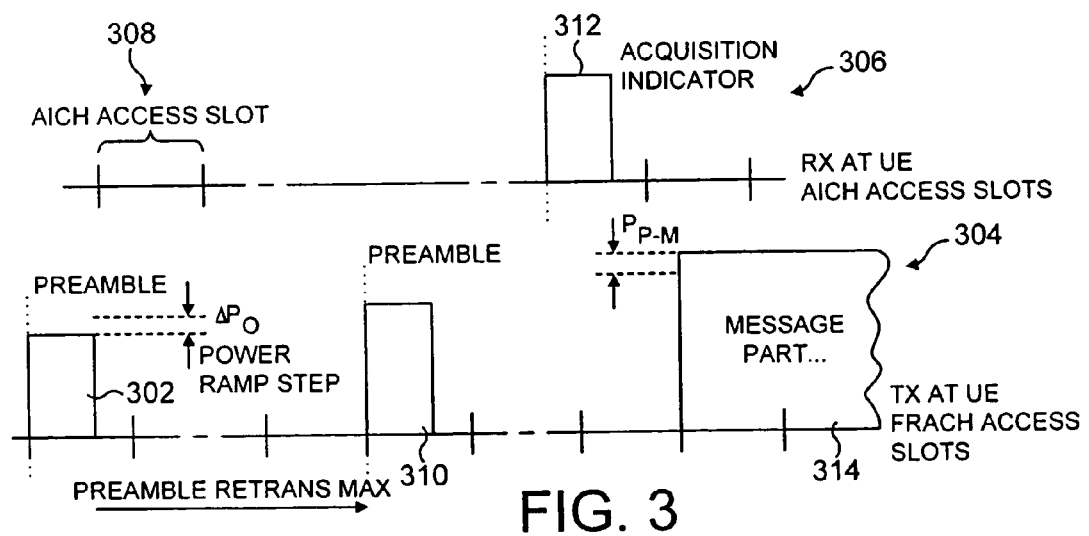
FIG. 3 illustrates the physical random access channel power ramping and message transmission.

In summary, the physical random-access procedure is illustrated in FIG. 3. The UE derives the available uplink access slots (in the next full access slot set) from the set of available RACH sub-channels within the given ASC. It randomly selects one of the available access slots and a signature from the set of available signatures within the given ASC. The random function is such that each of the possible selections is chosen with equal probability. In FIG. 3, the time line 304 represents uplink transmission and the time line 306 represents downlink transmission.

The UE transmits the first preamble 302 using the selected uplink access slot, signature, and preamble transmission power, calculated as:

Preamble_Initial_Power=Primary CPICH DL Tx power−CPICH_*RSCP*+*UL interference*+*UL*_required_CI The Primary CPICH DL Tx power and the UL required Carrier to Interference ratio (a constant value in 3GPP) are set by the RNP. The UL interference (receiver total wideband power in 3GPP) is measured at the base station. All are broadcast on the BCCH. The same procedure is followed by the UE when setting up the power level of the first PCPCH access preamble. The CPICH RSCP is the Received Signal Code Power, i.e. the received power on one code measured on the Primary CPICH. This is a quantity that the UE measures, in accordance with known techniques.

If no positive or negative Acquisition Indicator (AI≠+1 or −1) corresponding to the selected signature is detected in the downlink access slot 308 corresponding to the selected uplink access slot, then the terminal selects the next available access slot in the set of available RACH sub-channels within the given ASC, randomly selects a new signature from the set of available signatures within the given ASC, and increases the preamble power by $\Delta P_0$, which represents the power ramp in dB. The second preamble transmission is represented by block 310 in FIG. 3.

Responsive to the second preamble 310 in the uplink, the UE receives a positive acquisition indicator 312. Thereafter, the UE transmits the random access message 314 three or four uplink access slots after the uplink access slot of the last transmitted preamble, depending on the AICH transmission timing parameter. The transmission power of the control part of the random access message is Pp−m dB higher than the power of the last transmitted preamble. The transmission power of the data part of the random access message is set according to a corresponding gain factor, such gain factor being set between the control and data parts.

The message part of the RACH is transmitted at a higher power level than the preamble part, due to their differing processing gains.

For the CPCH, there is a power offset between the transmit power of the collision detect preamble and the initial transmit power of the CPCH power control preamble.

If the number of retransmissions exceeds the maximum number of retransmissions available (the Preamble Retrans Max value), or if a negative AT corresponding to the selected signature is detected, meaning that the up-link transmission cannot be received for some reason, then the UE exits the physical random access procedure.

In accordance with the present invention, and as discussed in further detail hereinbelow, the use of the random access channel, and the power control of the random access channel, is further controlled in dependence on the quality of service (QoS) requirements of the different UMTS bearer services that may be carried by the random access channel at the radio interface. As stated hereinabove, embodiments of the present invention are described herein with reference to the RACH channel, but the invention is not limited in its applicability to the RACH channel.

For different communications, the layer 2 block error rate (BLER) target is derived from the UMTS QoS bearer profile. The retransmission parameters, i.e. the number of RLC retransmissions allowed, are also derived from the UMTS bearer QoS profile. However none of the above-stated physical layer management parameters, used for controlling the power of the physical random access channel, have been defined on the basis of the distinct quality requirements of the service. The quality requirements may be set on the different logical channels mapped on the RACH.

As a result, the usage of these common resources may be ineffective. For example, when the RACH is employed in the uplink transmission, the quality of the communication may be set too low or too high, resulting in excessive power increases in most situations.

In accordance with the present invention, it is proposed to adapt the usage and power control of the random access channel in dependence on the quality requirements of the service. As described hereinafter, this is preferably achieved by the implementation of one of three described embodiments. However, alternative arrangements to the described embodiments may achieve the same result.

Figure 4:
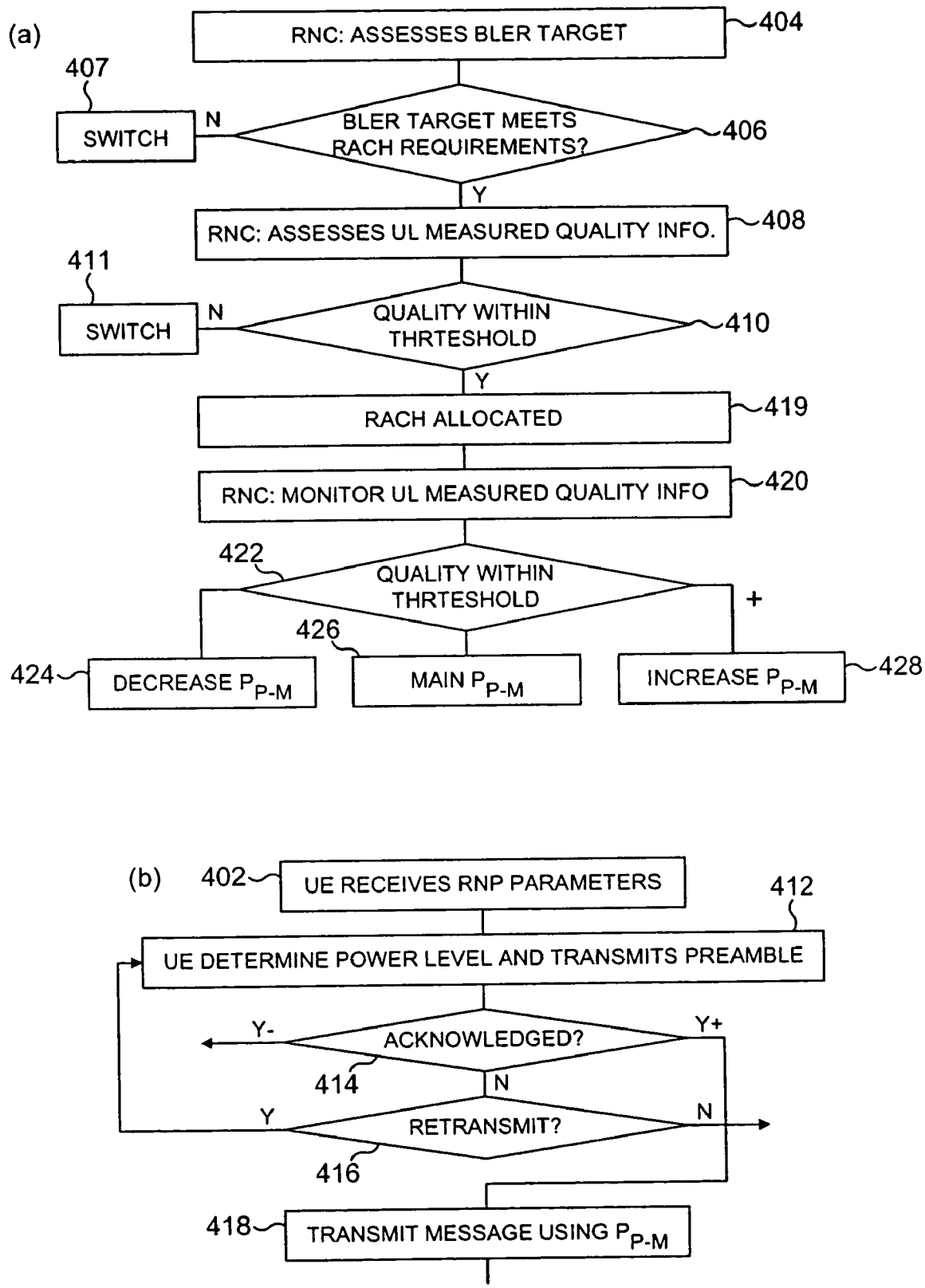
FIGS. 4(a) and 4(b) illustrate a method incorporating embodiments of the present invention.

Referring to FIGS. 4(a) and 4(b), an example implementation of uplink bearer service transmission incorporating three embodiments of the present invention is described. Although the embodiments are described in combination, they may in fact operate individually.

In accordance with the first embodiment of the present invention, before initiation of the RACH transmission begins, the RNC derives the BLER (block error rate) target for the bearer services. In a step 404 of FIG. 4(a), the RNC assesses the BLER target for the bearer services. The BLER defines the ratio of the incorrectly received transport blocks to the total number of received transport blocks. The BLER target—which preferably also defines the value of Pp–m of the parameters (i)–(ix)—may be directly set by RNP or indirectly calculated by the RNC from the UMTS QoS bearer profile, provided by the core network when the radio access bearer is set up or reconfigured. The RNC keeps a track of the measured BLER (i.e. Pp–m), and whether the measured BLER meets the BLER target, and whether the BLER target meets the RACH requirements.

In accordance with this first embodiment of the invention, in a step 406 of FIG. 4(a) the uplink transport channel is selected based on the BLER target. In step 406, the RNC determines whether the BLER target is within the predetermined BLER targets for the RACH. For example, this may be determined by the maximum number of RLC retransmissions allowed in the RACH. The definition of a target BLER will be understood by one skilled in the art. The significance of the use of the BLER in the preferred embodiments of the invention, is that the higher the BLER target the less transmission power is needed.

If the BLER target is not within the RACH requirements, then in a step 407 the bearer services are allocated to another channel. If the BLER target is within the RACH requirements, then the RACH channel control moves onto a step 408.

Thus, the UE may be allocated a dedicated channel when the target BLER and RLC re-transmission setting can be defined more specifically than on the RACH (or CPCH). There are thus two parameters which are significant, in the embodiments of the invention, for determining use of the RACH. These are the BLER target and the number of RLC retransmissions. The higher the numbers of RLC retransmission, and the lower the BLER target, the greater the interference and the RACH blocking. If a radio access bearer has a very strict QoS requirement then it can be allocated a dedicated channel immediately.

In accordance with the second embodiment of the present invention, further before initiation of the RACH transmission begins, the RNC assesses the uplink measured quality on the RACH. In a step 408, the RNC determines the uplink measured quality information for the RACH, measured at the network side.

In step 410 of FIG. 4(a), the RNC then determines whether the quality of the RACH in the up-link is within a threshold value. The threshold value may be predetermined. If it is determined that the quality is outside the threshold, then in a step 411 of FIG. 4(a) the bearer services are allocated to a different channel. If it is determined that the quality is within the threshold value, then the process proceeds to step 412.

The allocation of the RACH channel for bearer services is represented by step 419 in FIG. 4(a).

Thereafter, as illustrated by step 402 of FIG. 4(b), in accordance with standard techniques, the UE receives from the network the RNP parameters for the bearer services intended to be transmitted in the uplink random access channel. These parameters include the parameters stated in (i) to (ix) above. In the prior art, these parameters are used in order to initiates a RACH transmission for the bearer services.

Step 412 of FIG. 4(b) represents the initialisation of the RACH in the UE in accordance with conventional techniques. Referring to FIG. 3, the UE determines the power level for the first preamble, based on the parameters received in step 402 and in accordance with the formula stated hereinabove, and transmits the first preamble in the RACH as represented by block 302 in FIG. 3.

In a step 414 of FIG. 4(b), it is determined whether the first pre-amble is acknowledged. If it is not acknowledged, then in a step 416 of FIG. 4(b) it is determined whether the maximum number of retransmissions permissible has been exceeded. This parameter is provided by the RNP. If the maximum number of retransmissions is exceeded, then the routine exits. If the maximum number of retransmissions is not exceeded, then the process returns to step 412 for transmission of a second preamble.

For the second preamble, and as discussed hereinabove, the power level of the preamble is increased by ΔPo. The transmission of the second preamble is represented by block 310 in FIG. 3.

Again, in step 414, it is determined whether an acknowledgement is received. In practice, two types of acknowledgement may be received: a negative acknowledgement or a positive acknowledgement. A negative acknowledgement indicates that the message cannot be transmitted, as is known in the art. In the present example, it is assumed that the positive acknowledgement 312 of FIG. 3 is received in the downlink. As such, the process moves on to step 418 of FIG. (b).

In step 418 the message (318 in FIG. 3) is transmitted using the increased power level, over the last preamble, Pp−m.

In accordance with the third preferred embodiment of the present invention, the RNC monitors the uplink measured quality information in a step 420 of FIG. 4(a) after RACH transmissions have taken place. In this embodiment, for each bearer service there is preferably set a threshold level for the uplink quality, i.e. an uplink quality target. The RNC then compares, in a step 422 of FIG. 4(b), the uplink measured quality to the threshold level for that bearer service. If the uplink measured quality deteriorates or improves, then a corresponding change in the value Pp−m is made, and communicated to the UE, before the next physical random access procedure for that bearer service is initiated.

Thus, in dependence on the comparison of the quality with the threshold level, the process moves on to one of steps 424, 426 or 428 of FIG. 4(b). If the quality level is within the current threshold value, then in a step 426 the power level is maintained. If the quality deteriorates below an acceptable threshold level, then in a step 428 the power level is increased. If the quality improves above an acceptable threshold level, then in a step 424 the power level is decreased. The RNC communicates the adjusted power level to the UE, for use in uplink transmission.

Thus, if it appears that the measured BLER is below the BLER target then too high power is being used in the PRACH, and the value of Pp−m is decreased by a step. If it appears that the BLER is over the BLER target then too low power is being used in the PRACH, and the value of Pp−m is increased by a step. The new Pp−m value is included in the system information that is broadcast in the cell. In further refined embodiments, both the threshold determination in step 410 and the threshold determination in step 422 may be based on the BLER measurements. The uplink quality, and in particular the BLER, can be can be measured for each bearer service carried by the RACH considering its in-band identification and the information reported to the RNC by the Node B, i.e. NBAP C: Averaged number of successfully decoded RACH messages per radio frame during the reporting period per PRACH.

The invention thus allows for, in a described embodiment, the efficient usage of the random access channel for carrying UMTS bearer services with different quality requirements (i.e. different QoS profiles). The invention avoids any unnecessary uplink power rise due to the very different quality requirements of the bearer services carried by the RACH at the radio interface.

In particular, the invention allows the RACH to be used for bearer services with QoS attributes for which a particular BLER target with a particular number of RLC retransmissions is sufficient. Other bearer services with more strict QOS requirements are allocated to alternative resources, e.g. dedicated resources.

The present invention enables the power levels for different radio access bearers in the RACH to be adjusted. Without the present invention, the power level for all radio access bearers in the RACH is the same, and the number of RLC retransmissions needed will vary according to the QOS parameters.

The invention takes into account the fact that the PRACH parameters for all radio access bearers are the same, but different RAB's may have different quality requirements.

Based on statistics, the RNC learns what Pp−m can be used when a radio bearer with certain QoS profile (BLER target) is set up. This statistical value improves the convergence of this outer loop PC.

The invention has particular advantages for use in Third Generation (3G) UMTS (Universal Mobile Telecommunication System) Terrestrial Radio Access (UTRA-FDD) mobile telecommunications networks, and is therefore described herein with reference to such an implementation. However, it will be appreciated by those skilled in the art that the invention may be applied to other protocols and standards.

The invention claimed is:

1. A method of controlling common channel resources in the uplink of a communication system, wherein the control of the common channel resources is dependent upon the quality requirements associated with a radio access for use on the up-link common channel relative to a predetermined quality threshold and wherein the control of common channel resources comprises dynamically controlling the power difference between a preamble transmission in the common channel and a message in the common channel.

2. A method according to claim 1 wherein the power difference is initially set to a predetermined value.

3. A method according to claim 2 wherein the power difference is set to a value determined on the basis of the power difference required for at least one previous radio access having the same quality profile as the current radio access.

4. A method according to claim 1 wherein the power difference is increased if the up-link measured quality is below a threshold value.

5. A method according to claim 1 wherein the power difference is decreased if the up-link measured quality is above a threshold value.

6. A method according to claim 1 wherein the common channel is a random access channel.

7. A method according to claim 1 wherein the common channel is a common packet channel.

8. An element of controlling common channel resources in the uplink of a communication system, comprising means for controlling the common channel resources in dependence upon the quality requirements associated with a radio access for use on the up-link common channel relative to a predetermined quality threshold wherein the control means comprises means for dynamically controlling the power difference between a preamble transmission in the common channel and a message in the common channel.

9. An element according to claim 8 wherein the power difference is initially set to a predetermined value.

10. An element according to claim 8 wherein the power difference is set to a value determined on the basis of the power difference required for at least one previous radio access having the same quality profile as the current radio access.

11. An element according to claim 8 wherein the power difference is increased if the up-link measured quality is below a threshold value.

12. An element according to claim 8 wherein the power difference is decreased if the up-link measured quality is above a threshold value.

13. A method of controlling common channel resources in the uplink of a communication system, wherein the control of the common channel resources is dependent upon the quality requirements associated with a radio access for use on the up-link common channel being within a predetermined quality threshold, wherein the control of common channel resources comprises dynamically controlling the power difference between a preamble transmission in the common channel and a message in the common channel.

14. A radio network controller for controlling common channel resources in the uplink of a mobile communication system, comprising control means for controlling the common channel resources is dependence upon the quality requirements of a radio access for use on the up-link common channel being within a predetermined threshold, wherein the control means comprises means for dynamically controlling the power difference between a preamble transmission in the common channel and a message in the common channel.

15. A radio network controller, comprising a control unit configured to control common channel resources dependent upon quality requirements of a radio access for use on an up-link common channel within a predetermined threshold, wherein the control unit includes a dynamically power difference control unit configured to control a power difference between a preamble transmission in the common channel and a message in the common channel.

16. The radio network of claim 15, wherein the power difference is set to a value determined on the basis of the power difference required for at least one previous radio access having the same quality profile as the current radio access.

17. The radio network of claim 15, wherein the power difference control unit is configured to increase the power difference if the measured up-link quality is below a threshold value.

18. The radio network of claim 15, wherein the power difference is initially set to a predetermined value.

* * * * *